United States Patent [19]

Maresh et al.

[11] Patent Number: 5,083,259
[45] Date of Patent: Jan. 21, 1992

[54] COMPUTER BUS INTERCONNECTION DEVICE

[75] Inventors: Anthony J. Maresh, Brighton; Craig A. Moore, Ypsilanti, both of Mich.

[73] Assignee: Xycom, Inc., Saline, Mich.

[21] Appl. No.: 698,255

[22] Filed: May 6, 1991

Related U.S. Application Data

[63] Continuation of Ser. No. 281,261, Dec. 7, 1988, abandoned.

[51] Int. Cl.$^5$ .................. G06F 13/40; G06F 13/14; G06F 13/38
[52] U.S. Cl. ................... 395/325; 364/240; 364/240.1; 364/240.2; 364/240.5; 364/239.9; 364/242.92; 364/DIG. 1
[58] Field of Search ................... 364/200, 900

[56] References Cited

U.S. PATENT DOCUMENTS

4,590,556  5/1986  Berger et al. ............ 364/200
4,709,328  11/1987  Anthony, Jr. et al. ...... 364/200

OTHER PUBLICATIONS

Robertson "Interface your PC to the multibus", EDN, vol. 32, No. 1, Jan. 8, 1987, pp. 167, 169–178.
Schreier, "Serial and Parallel Schemes Bridge PCs to Industrial Buses", EDN, vol. 30, N. 14, pp. 63–67, Jun. 20, 1985.
Wright "Bus-Interface ICs", EDN, vol. 33, No. 11, May 26, 1988, pp. 123–136.
Product Description of "IBM PC/AT-VME Adaptor", BIT3 Computer Corportion, 12/1988.
Product Description of "IBM PC/AT Multibus I Adaptor", BIT3 Computer Corporation, 11/1987.
Product Description of "IBM PC/AT Multibus Adaptor", BIT3 Computer Corporation, 9/1987.
Product Description of "IBM PC/AT-A32 VME Adaptor", BIT3 Computer Corporation, 10/1989.
Heck "Quadlink", Interface Age, 1984, May, pp. 108–110.
Moskonitz "Appli-Card—Enhancing Your Apple", Interface Age, May 1983, pp. 107, 108, 111.
Peck, "Expanding Your Apple's Applications", Byte, Dec. 1984, A45–47, A122–126.

*Primary Examiner*—Thomas C. Lee
*Assistant Examiner*—Daniel Pan
*Attorney, Agent, or Firm*—Harness Dickey & Pierce

[57] ABSTRACT

The interconnection device attaches to the VMEbus backplane and implements a fully functional AT-compatible computer which is capable of acting as either a master or a slave on the VMEbus. The interconnection device defines a 64K window within the real mode address space of the AT computer which is mapped onto the VMEbus to allow the AT computer to access the VMEbus when in real mode. When the AT computer is in protected mode, addresses above the real mode/protected mode boundary are mapped onto the VMEbus address space. The interface apparatus modifies the AT architecture direct memory addressing (DMA) scheme to allow the microprocessor of the AT computer to act as a VMEbus slave when predefined addresses on the VMEbus are accessed.

13 Claims, 4 Drawing Sheets

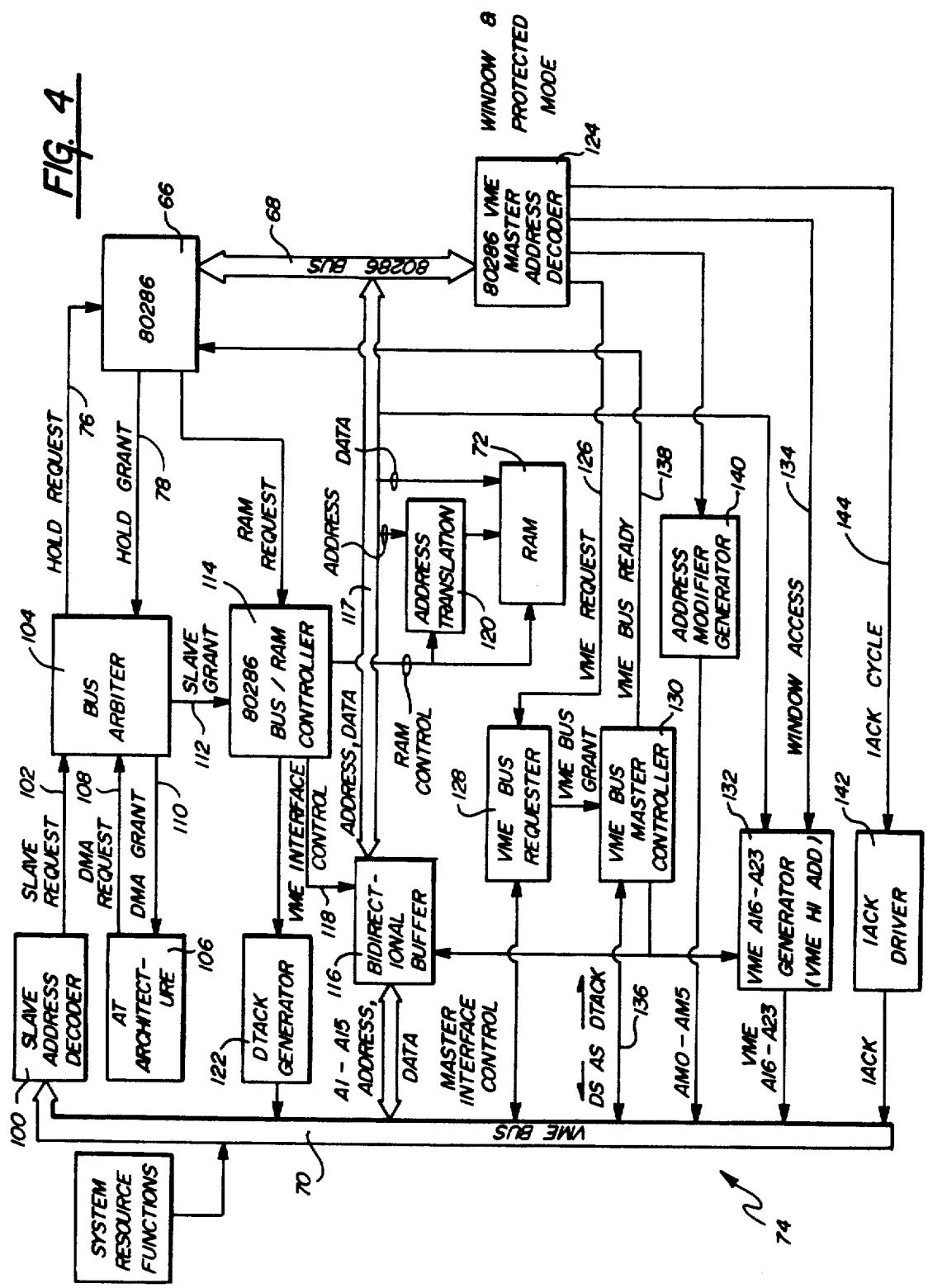

COMPUTER BUS INTERCONNECTION DEVICE

This is a continuation of U.S. patent application Ser. No. 281,261, filed Dec. 7, 1988 now abandoned.

BACKGROUND AND SUMMARY OF THE INVENTION

The present invention relates generally to computer bus architecture. More particularly, the invention relates to circuitry for interconnecting VMEbus and IBM PC/XT and AT bus architectures.

The VMEbus is a standard bus architecture which has become popular in automated manufacturing and processing environments. The VMEbus specification is defined in "VMEbus Specification Manual," Revision c.1, VMEbus International Trade Association, published by Printex Publishing, Inc., which is incorporated herein by reference.

The IBM PC/XT and the IBM AT architecture bus become a popular industry standard in office automation, database management and in the display of graphical information. The IBM PC/XT architecture is described in IBM Technical Reference for the PC/XT, available from International Business Machines and the IBM AT architecture is described in IBM Technical Reference for the AT, available from International Business Machines both references are incorporated herein by reference. The IBM AT bus architecture may be considered as a superset of the IBM PC/XT architecture. The IBM AT bus architecture retains compatibility with IBM PC/XT architecture, adding additional features and capabilities. For convenience, unless otherwise designated, the term IBM AT architecture will be used to refer to both the IBM PC/XT architecture and the IBM AT architecture.

The VMEbus and the AT bus architectures each have their own strengths and weaknesses and there are numerous applications where it would be advantageous to utilize both architectures together to take advantage of collective strengths and minimize the weaknesses. For example, a manufacturing installation might use a VMEbus-based computer system to control manufacturing equipment in the harsh manufacturing environment. VMEbus computer systems are ideally suited for such applications. However, VMEbus computer systems do not enjoy the wealth of user-friendly database management, spreadsheet and visual display software available for IBM AT bus systems. The VMEbus-based manufacturing installation, without access to IBM AT software, would require extensive programming in order to duplicate the database, spreadsheet and visual display functions.

As another example, consider a scientific data analysis installation in which IBM AT bus-based computer systems collect real time data and process that data using a sophisticated statistical processing software package. Although well-suited at running sophisticated statistical processing software, the AT bus architecture is not as well suited at data collection, particularly in harsh environments.

Both of the foregoing examples demonstrate the need for combining and uniting the VMEbus and AT bus architectures, to allow the user access to both the rugged and powerful VMEbus and the rich software environment of the IBM AT. The present invention provides such a solution in the form of an interface system between the VMEbus and the AT bus. In its presently preferred embodiment, the invention is implemented on a first circuit board which is configured to plug into the standard VME backplane thereby communicating with the VMEbus architecture. The first circuit board also implements a fully functional AT bus, complete with central processing unit and random access memory. A second circuit board, attachable to the first circuit board, and also adapted for attaching to the VMEbus backplane interfaces with the AT bus and provides additional AT computer functions such as input/output with disk drives and video displays.

The circuit of the invention allows the on-board central processing unit to act both as a fully functional master and slave on the VMEbus. The on-board random access memory is dual access and can be addressed by either the VMEbus as VMEbus memory or by the on-board central processing unit of the AT system as AT bus memory.

When the on-board central processing unit (an Intel 80286 or upwardly compatible equivalent) is in the real mode, the on-board central processing unit communicates with the VMEbus through a programmable window which can be user-selected to address several different VMEbus addressing modes. When the central processing unit is in the protected mode, the central processing unit addresses the VMEbus by addressing portions of the on-board random access memory which maps directly into the VMEbus address space.

In addition to implementing a fully functional AT computer with fully functional AT bus, the invention provides additional features not found on a conventional AT computer, including additional maskable and nonmaskable interrupts, a watchdog timer circuit, software abort and reset capability, as well as full access to the VMEbus and all VMEbus interrupt signals. Inherent incompatibilities between the Intel central processing unit architecture (IBM AT) and the Motorola architecture (VMEbus) are overcome by a mapping technique wherein certain read and/or write cycles of certain predefined memory locations are interpreted by the hardware as constituting signals or functions not commonly provided in both architectures. The interfacing hardware allows for interconnectability without burdening the processor or the DMA channels, resulting in fast, efficient operation.

For a more complete understanding of the invention, its objects and advantages, reference may be had to the following specification and to the accompanying drawings.

BRIEF DESCRIPTION OF THE DRAWINGS

FIG. 4 is a block diagram of the interface circuitry of the invention;

DESCRIPTION OF THE PREFERRED EMBODIMENTS

Figure 1:
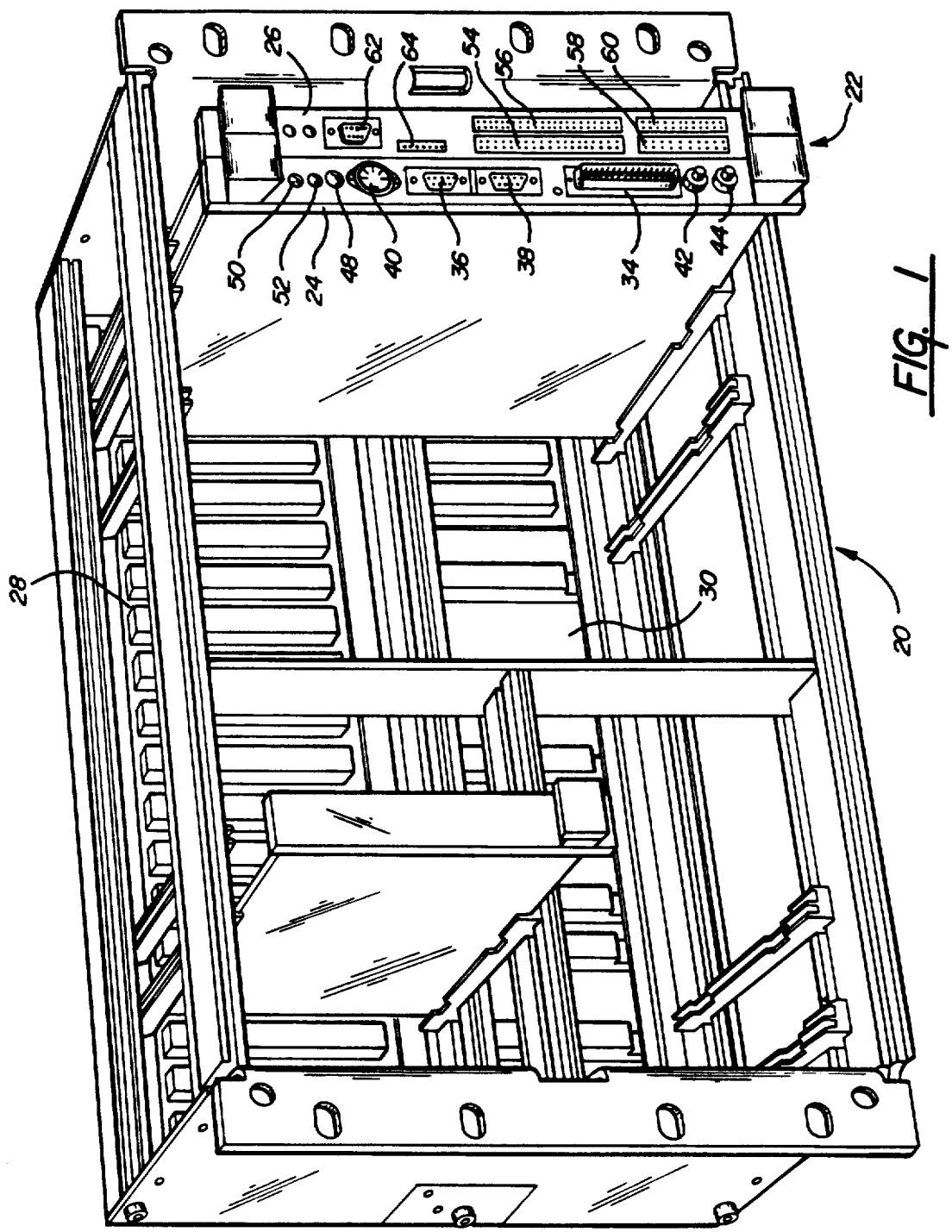
FIG. 1 illustrates a VMEbus subrack with the interface processor boards of the invention installed.
Figure 2:
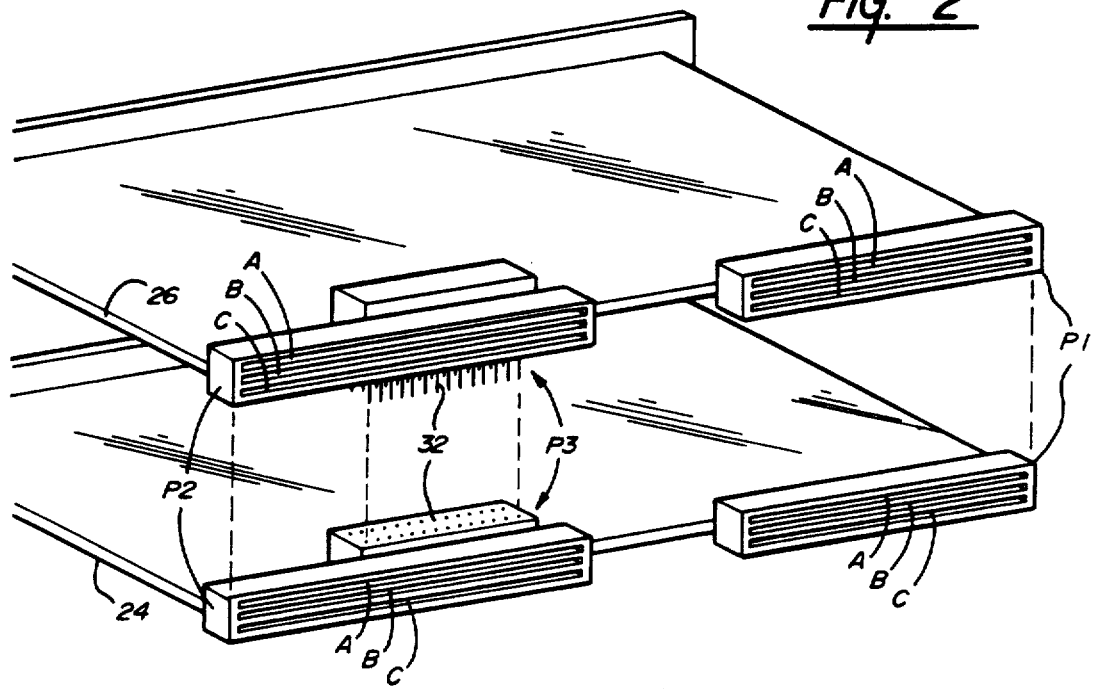
FIG. 2 is a perspective view of the interface processor boards of the presently preferred embodiment comprising separate and detachable CPU card and input/output card, illustrating the J3/P3 interconnection jack.

The present invention is adapted for plug compatibility with the VMEbus architecture. FIG. 1 illustrates a typical VMEbus subrack 20 into which the interface processor boards of the invention are installed as at 22. The presently preferred embodiment of the invention is implemented on two separate attachable and detachable cards, a CPU card 24 and an input/output card 26. Both cards are adapted to plug into the J1 backplane 28 and J2 backplane 30. As seen in FIG. 2, cards 24 and 26 connect to one another through a laterally extending plug and jack connector 32, also designated as plug P3 and jack J3 connectors.

Although other arrangements are possible, in the presently preferred embodiment CPU card 24 includes an 80286 Intel microprocessor, dual access random access memory, an optional 80287 math coprocessor, a full IBM AT mother board architecture with fully functional AT bus and three software configurable ports (two serial ports and one parallel port). In addition, the CPU card 24 includes the VMEbus master, slave and interrupt handler interfaces. In addition to standard IBM AT mother board features, the CPU card also includes a watchdog timer circuit, control/status registers as well as software abort and reset capabilities. The IBM AT bus is accessible on either the VMEbus P2 connector or on the optional P3 connector.

Input/output card 26 provides the interface between the CPU card and floppy disk, hard disk and graphics controllers. Input/output card 26 includes EGA, CGA, MDA and Hercules graphics support, including 256K bytes of video RAM. The input/output card further includes an IBM PC/AT-compatible Winchester and floppy disk controller which can control up to two Winchester hard disk drives (ST506/ST412, 16 read/write heads each addressing 2,048 cylinders). The floppy disk drive controller can control up to two floppy disk drives (double-sided, double-density, quad-density and quad-high density).

With reference to FIG. 1, the front panel of CPU card 24 includes a Centronics-compatible DB-25 parallel port jack 34 and two DB-9 serial port jacks 36 and 38 to which peripheral devices and printers may be attached. Keyboard jack 40 is provided for attachment of an IBM AT-compatible keyboard. Front panel abort and reset push buttons 42 and 44 are also provided as illustrated. Depressing the abort button causes a non-maskable interrupt (NMI) to be sent to the microprocessor which would then execute the designated interrupt routine (typically one written by the user). Depressing the reset button electrically resets the entire system causing a cold boot reset of the full system. A speaker jack 48 is provided for attaching a system speaker. Light-emitting diodes 50 and 52 indicate whether power-on self-test diagnostic routines have passed or failed. This is useful, since the invention may be used with remotely located monitor, hence the pass/fail indicators are useful in determining at a glance whether diagnostics have failed.

Input/output card 26 also has a front panel which provides jacks 56, 58 and 60 to which hard disk drives may be attached. Floppy diskette drives are similarly attached to jack 54. Plug 62 is provided for attachment of a video monitor. If desired, a light pen can be attached to plug 64.

In order to ensure maximum flexibility and compatibility with the VMEbus structure, all P1 connector terminals are assigned the standard VMEbus signals. With reference to FIG. 2, rows A and C of the P2 connector, which are defined by the VMEbus standard as user-configurable, have been assigned the XT bus signals (i.e., the bus signals which are common to both XT and AT architectures). The VMEbus specification reserves row B of the P2 connector for 32 bit architectures. To accommodate a 32 bit architecture the invention offers the option of either assigning the AT bus signals (i.e., the AT bus signals not found on the XT architecture) to row B of the P2 connector (when 32 bit architecture is not desired) or to the P3 connector (when 32 bit VMEbus architecture is desired). See Table I and FIG. 2 for a further detailed explanation of the signal assignments.

TABLE I

PIN ASSIGNMENTS

| | J1/P1 | | |
|---|---|---|---|
| Pin Number | Row a | Row b | Row c |
| 1 | D00 | BBSY* | D08 |
| 2 | D01 | BCLR* | D09 |
| 3 | D02 | ACFAIL* | D10 |
| 4 | D03 | BG0IN* | D11 |
| 5 | D04 | BG0OUT* | D12 |
| 6 | D05 | BG1IN* | D13 |
| 7 | D06 | BG1OUT* | D14 |
| 8 | D07 | BG2IN* | D15 |
| 9 | GND | BG2OUT* | GND |
| 10 | SYSCLK | G3IN* | SYSFAIL* |
| 11 | GND | BG3OUT* | BERR* |
| 12 | DS1* | BR0* | SYSRESET* |
| 13 | DS0 | BR1* | LWORD* |
| 14 | WRITE* | BR2* | AM5 |
| 15 | GND | BR3* | A23 |
| 16 | DTACK* | AM0 | A22 |
| 17 | GND | AM1 | A21 |
| 18 | AS* | AM2 | A20 |
| 19 | GND | AM3 | A19 |
| 20 | IACK* | GND | A18 |
| 21 | IACKIN* | SERCLK(1) | A17 |
| 22 | IACKOUT* | SERDAT*(1) | A16 |
| 23 | AM4 | GND | A15 |
| 24 | A07 | IRQ7* | A14 |
| 25 | A06 | IRQ6* | A13 |
| 26 | A05 | IRQ5* | A12 |
| 27 | A04 | IRQ4* | A11 |
| 28 | A03 | IRQ3* | A10 |
| 29 | A02 | IRQ2* | A09 |
| 30 | A01 | IRQ1* | A08 |
| 31 | −12V | +5VSTDBY | +12V |
| 32 | +5V | +5V | +5V |

| | J2/P2 | | |
|---|---|---|---|
| Pin Number | Row a | (32 bit VMEbus) Row b | (16 bit VMEbus) Row b | Row c |
| 1 | I/O CHCK | +5V | +5V | N.C. |
| 2 | SD7 | GND | GND | IRQ9 |
| 3 | SD6 | RESERVED | MFMW* | DRQ2 |
| 4 | SD5 | A24 | SD8 | N.C. |
| 5 | SD4 | A25 | SD9 | SMEMW* |
| 6 | SD3 | A26 | SD10 | SMEMR* |
| 7 | SD2 | A27 | SD11 | IOW* |
| 8 | SD1 | A28 | SD12 | IOR* |
| 9 | SD0 | A29 | SD13 | DACK3* |
| 10 | IOCHRDY | A30 | SD14 | DRQ3 |
| 11 | AEN | A31 | SD15 | DACK1* |
| 12 | SA19 | GND | GND | DRQ1 |
| 13 | SA18 | +5V | +5V | REFRESH* |
| 14 | SA17 | D16 | MEMCS16* | CLK |
| 15 | SA16 | D17 | IOCS16* | IRQ7 |
| 16 | SA15 | D18 | IRQ10 | IRQ6 |
| 17 | SA14 | D19 | IRQ11 | IRQ5 |
| 18 | SA13 | D20 | IRQ12 | IRQ4 |

TABLE I-continued

PIN ASSIGNMENTS

| 19 | SA12 | D21 | IRQ15 | IRQ3 |
|---|---|---|---|---|
| 20 | SA11 | D22 | IRQ14 | DACK2* |
| 21 | SA10 | D23 | DACK0* | T/C |
| 22 | SA9 | GND | GND | BALE |
| 23 | SA8 | D24 | DRQ0 | OSC |
| 24 | SA7 | D25 | DACK5* | SBHE |
| 25 | SA6 | D26 | DRQ5 | LA23 |
| 26 | SA5 | D27 | DACK6* | LA22 |
| 27 | SA4 | D28 | DRQ6 | LA21 |
| 28 | SA3 | D29 | DACK7* | LA20 |
| 29 | SA2 | D30 | DRQ7 | LA19 |
| 30 | SA1 | D31 | MASTER* | LA18 |
| 31 | SA0 | GND | GND | LA17 |
| 32 | GND | +5V | +5V | MEMR* |

J3/P3

| Pin Number | (32 bit VMEbus) Row a | (32 bit VMEbus) Row b |
|---|---|---|
| 1 | MEMW* | DACK0* |
| 2 | SD8 | DRQ0 |
| 3 | SD9 | DACK5* |
| 4 | SD10 | DRQ5 |
| 5 | SD11 | DACK6* |
| 6 | SD12 | DRQ6 |
| 7 | SD13 | DACK7* |
| 8 | SD14 | DRQ7 |
| 9 | SD15 | MASTER* |
| 10 | MEMCS16* | NO CONNECTION |
| 11 | IOCS16* | NO CONNECTION |
| 12 | IRQ10 | +5V |
| 13 | IRQ11 | +5V |
| 14 | IRQ12 | GND |
| 15 | IRQ15 | GND |
| 16 | IRQ14 | GND |

Figure 3:
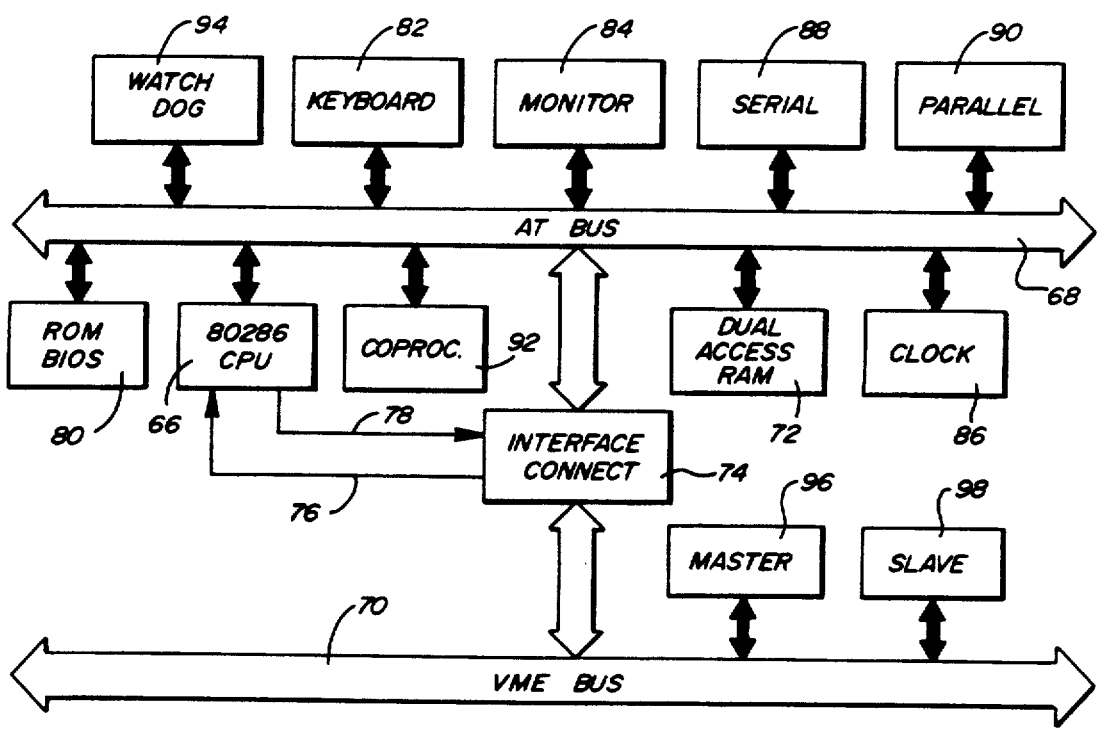
FIG. 3 is a block diagram of the interface processor system of the invention.

Referring now to FIG. 3, the functional elements of the CPU card will be described. The presently preferred embodiment uses an Intel 80286 microprocessor. This is the presently preferred microprocessor, since the IBM AT is based upon the 80286. However, the invention can be implemented using other upwardly compatible microprocessors, such as the Intel 80386 microprocessor.

The Intel 80286 and upwardly compatible microprocessors can be operated in a first memory addressing mode, called the "real" mode and a second mode, called the "protected" mode. In the real mode the processor can address 1 megabyte of memory. In the protected mode the processor can address 16 megabytes of memory. The real mode is compatible with earlier 8086 and 8088 microprocessors which had only a 20 bit addressing capability, allowing addressing of $2^{20}$ or 1 megabyte of different memory addresses. The MS DOS operating system which runs on the IBM AT architecture uses the real mode addressing scheme. The IBM OS/2 operating system uses the protected mode addressing scheme. By using an Intel 80286 microprocessor or upwardly compatible equivalents, the invention is able to operate in either the MS DOS or the OS/2 operating system environments.

The Intel 80386 microprocessor offers a third addressing mode, called the "virtual" mode, which permits the processor to address a plurality of 1 megabyte memory spaces, each appearing as a real mode memory space. It is anticipated that future operating systems will exploit the virtual mode of the Intel 80836 microprocessor to implement more powerful multitasking features, such as the ability to run a plurality of standard MS DOS applications concurrently. When standards for such virtual mode operation have been adopted, it is contemplated that the present invention can be modified to utilize the virtual mode addressing features of the 80836 microprocessor.

As shown in FIG. 3, the microprocessor on board the CPU card 24 is depicted at 66 and designated as an 80286 CPU. The 80286 bus or AT bus is indicated at 68 while the VMEbus is indicated at 70. It will be understood that the 80286 bus or AT bus and the VMEbus each comprise the requisite individual address, data and control buses defined by the respective standards set forth in the publications cited above.

Attached to the 80286 bus or AT bus is dual access RAM 72, which forms a portion of the circuit by which AT bus 68 and VMEbus 70 communicate with one another. Additional interface circuitry by which the buses communicate is depicted at 74. In addition to connecting directly to the AT bus and VMEbus, the interface circuitry 74 also supplies a HOLD REQUEST signal to microprocessor 66 on line 76 and receives a HOLD GRANT signal from microprocessor 66 on line 78. The details of interface circuitry 74 will be discussed more fully below.

Also attached to the AT bus 68 are a plurality of additional systems and devices which comprise and/or augment the AT-compatible computer on which software for IBM microcomputers can be run under the MS DOS (PC DOS) or OS/2 operating systems. These additional components include ROM BIOS 80, keyboard 82, video monitor 84, real time clock 86, one or more serial and parallel ports 88 and 90, an optional math coprocessor 92 and a watchdog timer circuit 94.

The watchdog timer circuit 94 is not commonly found on IBM AT-compatible computers, but is useful for adapting the invention to harsh industrial environments. The watchdog timer circuit is preprogrammed to expect periodic reset signals from the microprocessor 66. If these signals are not periodically received, it may be assumed that the microprocessor is locked up in a never-ending loop or wait state. In such event, watchdog timer circuit 94 sends a nonmaskable interrupt to the microprocessor.

The VMEbus 70 is likewise configured in the usual fashion and may support one or more master devices 96 and slave devices 98. The present invention couples the AT bus and VMEbus, allowing VMEbus masters, such as master 96, to access the dual access RAM 72 and also permits the AT bus microprocessor 66 to access the dual access RAM 72 and also to act as either a master device or a slave device on the VMEbus.

Referring now to FIG. 4, the interface circuitry 74 will be described in greater detail. For reference, FIG. 4 includes microprocessor 66 as well as AT bus 68 and VMEbus 70. The HOLD REQUEST line 76 and HOLD GRANT line 78 (shown in FIG. 3) are also illustrated. The interface circuitry 74 includes a slave address decode circuit 100 which constantly monitors the VMEbus and detects when a master device 96 on the VMEbus wants to address the dual access RAM 72. The slave address decode circuit does this by monitoring the VMEbus, address bus, address modifiers, and data strobes. Circuit 100 thus provides the slave address decoding function required of standard VMEbus slave devices.

When the slave address decode circuit 100 detects a request to access RAM 72, it issues a slave request signal on line 102 which signals a bus arbiter circuit 104, which in turn interfaces the VMEbus slave interface and the AT bus DMA controller with microprocessor 66. The DMA controller is a component of the standard AT architecture illustrated diagrammatically at 106. The DMA controller is used in the usual fashion to move data directly to and from random access memory without CPU intervention. The DMA controller acquires access to the AT bus by issuing a DMA REQUEST signal on line 108 and by receiving a DMA GRANT signal on line 110. In conventional AT architecture the DMA REQUEST signal would be conveyed to microprocessor 66 via line 76 (herein designated the HOLD REQUEST line) and the DMA GRANT signal would be issued from microprocessor 66 via line 78 (herein referred to as the HOLD GRANT line). The bus arbiter circuit 104 is thus interposed between the conventional channel by which the DMA controller signals communicate with microprocessor 66. Bus arbiter circuit 104 links the VMEbus slave interface into the DMA controller scheme, providing an additional SLAVE REQUEST line 102 and an additional SLAVE GRANT line 112 needed to allow the dual access RAM 72 attached to microprocessor 66 to act as a VMEbus slave.

The 80286 bus/RAM controller 114 receives the SLAVE GRANT signal on line 112 and controls both RAM 72 and also bidirectional buffer 116. Bidirectional buffer 116 connects the address and data lines of VMEbus 70 with the address and data lines of AT bus 68. For illustration purposes these address and data lines have been assigned common reference numeral 117. The direction of signal flow through buffer 116 is controlled by the VME slave interface control signal on line 118 from bus/RAM controller 114. When a SLAVE GRANT signal is placed on line 112, the bus/RAM controller 114 switches the bidirectional buffer 116 for signal flow from the VMEbus to the AT bus so that the VMEbus can drive the desired address onto the bus structure defined by buses 117. Bus/RAM controller 114 also provides all the conventional memory timing signals such as RAS and CAS signals needed for memory timing cycles. During VMEbus WRITE cycles, the bidirectional buffer 116 directs data on 117 in toward RAM 72. During VMEbus READ cycles, the bidirectional buffer 116 switches to the opposite direction to direct data on 117 out toward the VMEbus 70. Bus/RAM controller also communicates with address translation hardware 120, which converts or maps the linear, contiguous addresses of the VMEbus into the noncontiguous blocks of the AT bus. DTACK generator 122 provides the DTACK signal for instructing the VMEbus that the RAM 72 access cycle has completed.

With regard to the address translation hardware 120, RAM 72 appears as a contiguous block of memory to the VMEbus 70. For example, in a 1 megabyte embodiment, RAM 72 would appear as one contiguous 1 megabyte block of memory to the VMEbus. To the AT bus 68, however, RAM 72 appears as two separate blocks, a first 640K block occupying the traditional MS DOS memory space and a second block occupying a portion of the memory space reserved for 80286 protected mode operation (above the 1 megabyte real mode/protected mode boundary).

The amount of memory in this second block will depend on the size of available random access memory 72. For example, if a 1 megabyte embodiment is implemented, the second memory block will be 384K. If a 4 megabyte embodiment is implemented, the second block will be 3456K. For an overview of the presently preferred memory mapping of dual access RAM 70, as seen by the AT bus 68, reference may be had to FIGS. 5 and 6, which illustrate a 1 megabyte embodiment and a 4 megabyte embodiment, respectively.

With regard to the DTACK generator 122, there is an interlock on the VMEbus between the data strobes and the DTACK signal. When a slave is addressed on the VMEbus, the requesting master will wait until the slave is ready to respond. The slave so indicates by issuing a data transfer acknowledge signal or DTACK signal. DTACK generator 122 is connected to VMEbus 70 for the purpose of issuing DTACK signals when the circuit of the invention, acting as a slave device, is ready to respond to the VMEbus master. For example, when data is being transferred over bus structure 117 from RAM 72, to the VMEbus 70 through bidirectional buffer 116, the DTACK signal from DTACK generator 122 indicates that the data in buffer 116 is valid and may be read by the VMEbus. Following the READ cycle by the master, the slave request condition may be cancelled.

The above-described portion of interface circuitry 74 allows the dual access RAM 72 attached to microprocessor 66 to serve as a slave device on the VMEbus 70. Data communication is through the dual access RAM memory 72. A more complete overview of the shared dual access memory scheme will be discussed in connection with FIGS. 5 and 6.

In operation, SLAVE REQUEST signals from the VMEbus are intercepted by the slave address decoder 100 and passed to the bus arbiter 104 which switches the microprocessor 66 interface circuitry between the normal DMA circuitry and the VMEbus SLAVE REQUEST circuitry. A common address and data bus structure 177 acting through bidirectional buffer 116 under control of bus/RAM controller 114 directs data flow to the random access memory 72 and between the AT bus 68 and VMEbus 70. Address translation circuitry 120 allows both the contiguously mapped VMEbus and the noncontiguously mapped AT bus to address the contiguously arranged dual access RAM 72. This circuitry allows the microprocessor 66 to communicate over the VMEbus as a fully functional VMEbus slave.

Figure 6:
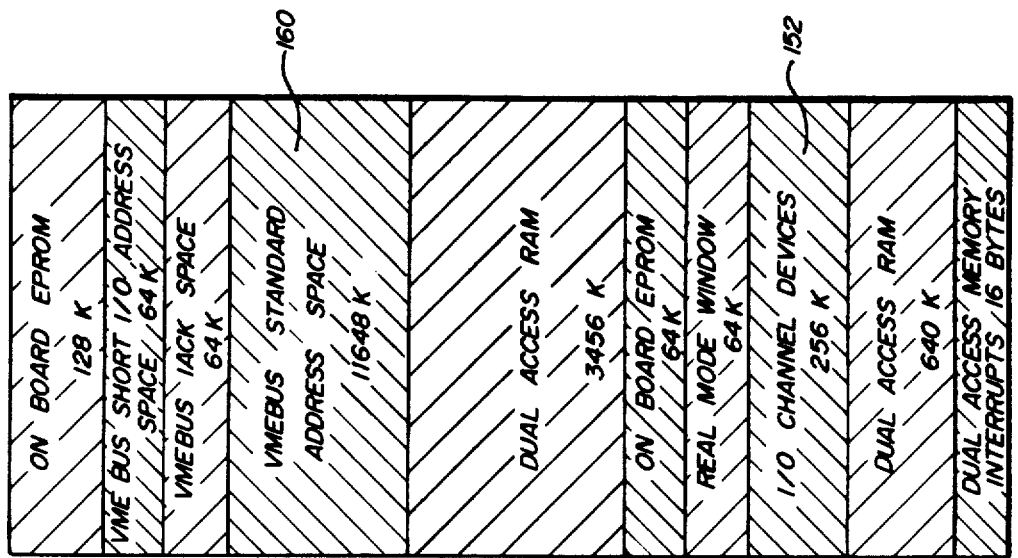
FIG. 6 is a memory map of a 4 megabyte embodiment of the invention as seen by the CPU of the interface processor of the invention.
Figure 5:
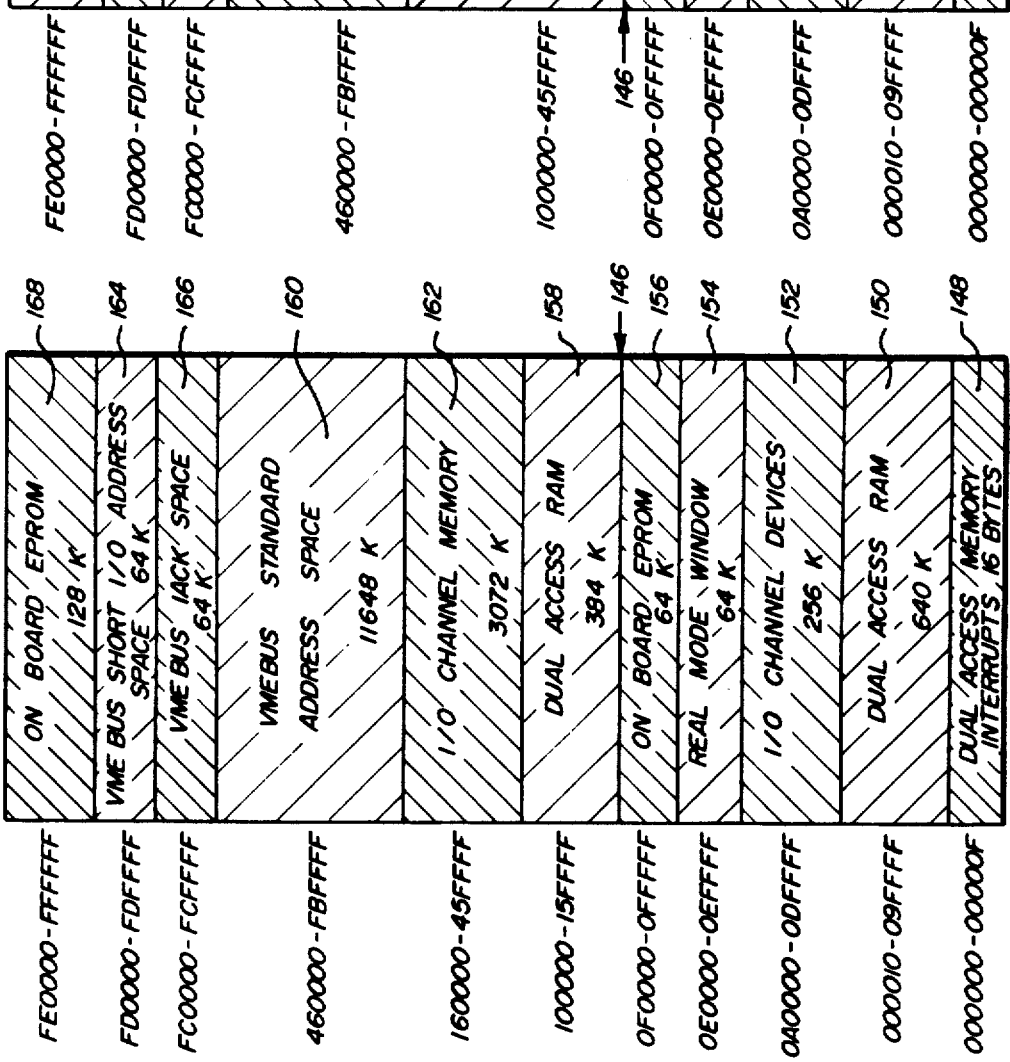
FIG. 5 is a memory map of a 1 megabyte embodiment of the invention as seen by the CPU of the interface processor.

The remainder of the circuitry illustrated in FIG. 4 allows the microprocessor 66 to communicate over the VMEbus 70 as a fully functional VMEbus master. The VMEbus master address decoder circuit 124 is connected to the AT bus 68 and monitors the address lines to determine if certain memory addresses reserved for VMEbus access have been addressed by microprocessor 66. The present invention provides two different methods for accessing the VMEbus. When the microprocessor 66 is in the real mode, communication is through a 64K window located above the 640K MS DOS memory partition. When microprocessor 66 is in the protected mode, communication is through a different block of memory located above the 1 megabyte real mode/protected mode boundary. These memory locations are illustrated in FIGS. 5 and 6 and will be discussed more fully below.

When VMEbus master address decoder 124 detects that microprocessor 66 has accessed the designated real mode window or the protected mode memory space, a VME REQUEST signal is issued on line 126 to the VMEbus requester circuit 128. The VMEbus requester circuit is a circuit defined by the VMEbus specification for the purpose of asserting bus request signals to the VMEbus and waiting for the bus grant signal from the VMEbus arbiter in return. The VMEbus requester circuit under the VMEbus specification also determines upon receipt of a bus grant signal whether it will honor the bus grant or whether it will pass the bus grant in daisy chain fashion to the next circuit board attached to the VMEbus backplane.

The VMEbus requester conveys the VMEbus GRANT signal to the VMEbus master controller 130 which actually controls the cycle on the VMEbus. When the VMEbus master controller 130 first receives the VMEbus GRANT it will turn on the bidirectional buffers 116 causing them to point outward to the VMEbus 70. The address issued by microprocessor 66 is thus conveyed over the bus structure 117 through bidirection buffers 116 to the VMEbus 70 for mapping onto the VMEbus address lines.

Address lines A1-A15 are directly mapped from the AT bus 68 to the VMEbus 70. In order to issue VMEbus addresses A16-A23, a VMEbus address generator circuit 132 is provided. The address generator circuit is responsive to VME master address decoder 124 and receives address signals from the AT bus via bus structure 117. The master address decoder circuit 124 issues a WINDOW ACCESS signal on line 134 which instructs the address generator 132 whether microprocessor 66 is in the real mode (using the 64K window) or in the protected mode (using the memory space above the real mode/protected mode boundary). When the microprocessor is in the real mode, the VMEbus address generator generates the appropriate VMEbus address signals for A16-A23. When microprocessor 66 is in the protected mode, the actual addresses on AT bus 68 are mapped via bus structure 117, through address generator circuit 132 directly to the VMEbus address lines A16-A23. The VMEbus address generator circuit 132 has a VMEbus High Address register for holding the appropriate A16-A23 values for mapping onto the VMEbus when microprocessor 66 is in the real mode.

Depending on whether a READ or a WRITE is being executed, the bidirectional buffer 116 is appropriately directed by bus master controller 130, which is in receipt of the data strobe (DS), the address strobe (AS) and the data transfer acknowledge (DTACK) signals on control lines 136. When the bus master controller determines that the data transfer cycle from the VMEbus slave being accessed has been completed, it issues a READY signal on line 138 to microprocessor 66. When microprocessor 66 initiates a VMEbus master sequence, it enters a wait state which remains in effect until the selected slave has responded. The READY signal signals microprocessor 66 that the communication with the selected slave has been completed, whereupon microprocessor 66 terminates the wait state and returns to normal operation.

In order to provide full VMEbus addressing capability, the interface circuitry 74 also includes an address modifier generator circuit 140 which provides the address modifiers AM0-AM5 used to convey VMEbus information such as the address size, cycle type, and/or master identification in accordance with VMEbus standards. The circuit also includes an interrupt acknowledge driver circuit 142 which receives interrupt acknowledge (IACK) signals from the VMEbus used by an interrupt handler on the VMEbus to acknowledge an interrupt request. The interrupt acknowledge driver circuit receives interrupt acknowledge cycle signals on line 144 from the master address decoder 124. Master address decoder 124 maps certain AT address calls as interrupt requests by the microprocessor 66. In the presently preferred embodiment certain predefined addresses on the AT bus are treated as interrupt request lines. When one of these addresses is selected, master address decoder 124 issues the IACK CYCLE signal which causes IACK driver 142 to generate the appropriate IACK signal. A more complete discussion of the presently preferred interrupt handling scheme is presented below in connection with the system software operation.

The VMEbus/AT bus interface defined by the invention may be further understood with reference to the memory map diagrams of FIGS. 5 and 6. Both memory maps depict the memory space as seen by microprocessor 66. FIG. 5 depicts a 1 megabyte memory map model whereas FIG. 6 depicts a 4 megabyte memory map model. A comparison of the two memory maps reveals the principal difference being the amount of dual access RAM above the 1 megabyte real mode/protected mode boundary. That boundary is designated by reference numeral 146 in both Figures. The 80286 real mode memory space is below boundary 146 and the protected mode memory is above boundary 146.

As illustrated in FIGS. 5 and 6, beginning at the base address, both memory map models allocate 16 bytes for implementing a VMEbus interrupt handling scheme using the dual access memory. If a VMEbus master reads one of these 16 bytes, the master address decoder 124 generates an interrupt to microprocessor 66. In this fashion, master devices on the VMEbus which cannot generate interrupts, as many masters cannot, are able to interrupt microprocessor 66. The 16 bytes of dual access memory allocated for interrupt handling is designated at 148. This same memory space is used in the AT system architecture for storing vector jump addresses and this use remains unchanged in the present invention. Thus microprocessor 66 is still able to access the memory space 148 to determine vector jump addresses in the usual fashion. The act by a VMEbus master of reading memory space 148 triggers the interrupt. The VMEbus master normally has no use for the data residing in memory space 148 (AT vector jump addresses) and hence this data may normally be ignored by the VMEbus master. In other words, it is the act of reading memory space 148 by the VMEbus master which generates the interrupt to microprocessor 66. The values returned by the reading of this memory space are of no importance to the interrupt cycle.

This dual use of memory space 148 is quite advantageous, since it permits the conveyance of interrupt signals to microprocessor 66 without requiring additional interrupt lines not defined by the VMEbus standard and at the same time permits the memory space to be used in the conventional fashion as an AT vector address jump table. This mapping of nonanalogous functions (interrupting and data storage) can of course be implemented at other memory spaces within the memory map. The selection of the low 16 bytes is presently preferred since the VMEbus master devices will normally have no reason to access this memory space for data, the data being valid only as an AT vector jump address.

Above memory space 148 is a 640K block of dual access RAM 150 which may be accessed as conventional MS DOS memory by the AT system. Above the RAM space 150 the next 256K bytes are allocated as input/output channel devices 152. Memory space 152 is typically allocated to EPROM devices on adapter cards, such as video cards or other external adapter cards which are attached to the AT bus and communicate with it over the AT input/output channel.

Above memory space 152 there is a 64K memory space defined as the real mode window 154. It is this window through which the AT computer system comprising microprocessor 66 and associated AT architecture may communicate with the VMEbus, when microprocessor 66 is in the real mode. Real mode window 154 lies immediately adjacent the AT onboard EPROM space 156 which contains the conventional BIOS for the AT system. As illustrated, the EPROM space 156 lies immediately below the 1 megabyte boundary 146. The presently preferred embodiment requires 64K for the system BIOS. The IBM AT specification reserves 128K for the system BIOS, a portion of that 128K being unused. The real mode window 154 may comprise all or a portion of the memory space reserved, but unused, for the AT BIOS.

Above boundary 146 the system has additional dual access RAM 158. The size of this RAM will depend upon the amount of memory installed on the CPU card 24. In the 1 megabyte memory model of FIG. 5 RAM space 158 contains 384K. In the 4 megabyte memory model of FIG. 6 the RAM space 158 contains 3,456K. In both instances the size of the additional dual access RAM will be the amount of total memory (e.g., 1 megabyte or 4 megabyte) minus the 640K of dual access RAM residing at space 150. Physically RAM 72 comprises the dual access RAM memory (1 megabyte or 4 megabyte in the presently preferred embodiments). FIGS. 5 and 6 illustrate how RAM 72 is arranged as noncontiguous blocks residing at memory spaces 150 and 158.

The present invention allows the AT computer implemented by microprocessor 66 to address memory residing in the VMEbus standard address space. That space is designated by reference numeral 160 in FIGS. 5 and 6. As a general rule, microprocessor 66 of the AT computer system can access onboard memory, i.e., memory attached conventionally to the AT bus structure, more quickly than it can access memory attached to the VMEbus. If a particular system needs additional fast access memory, additional AT compatible memory circuits can be attached to the AT bus for this purpose. FIG. 5 illustrates an example of such an implementation where the additional onboard memory is designated as input/output (I/O) channel memory 162. For comparison purposes, similar input/output channel memory is not illustrated in FIG. 6. While memory in both the VMEbus standard address space 160 and the input/output channel memory space 162 are both accessible to microprocessor 66, the VMEbus standard address space 160 must be accessed through the master interface circuitry of FIG. 4, whereas the input/output channel memory 162 may be accessed directly via the AT bus.

Comparing FIGS. 5 and 6, one principal difference is that in the 4 megabyte model of FIG. 6 the CPU card 24 is populated with 4 megabytes of memory, 3,456K of that memory residing above the 1 megabyte boundary 146. In the 1 megabyte model of FIG. 5 only 384K above the 1 megabyte boundary 146 is populated. The remaining 3,072K, designated as input/output channel memory 162, is not populated on CPU card 24 but instead reserved for user upgrade by attaching external memory cards. Stated differently, the 3,456K space above boundary 146 is fully populated by dual access RAM memory in the model of FIG. 6, whereas it is only partially populated with RAM (384K) with the remainder (3,072K) being reserved for input/output channel memory in the model of FIG. 5.

The VMEbus standards define a standard address space of 16 megabytes. Only a portion of that standard address space is accessible to microprocessor 66. This standard address space which the AT microprocessor 66 can address is designated at 160. In addition, the VMEbus specification defines a separate Short input/output address space which is separate from the standard 16 megabyte memory space. Microprocessor 66, when in the protected mode, can access this Short input/output address space as designated at 164. Other provisions are made for accessing the Short input/output address space when the microprocessor 66 is in the real mode, as will be discussed below.

The VMEbus standard also defines how interrupt handling occurs using the Priority Interrupt Bus through a VMEbus IACK cycle. The invention defines a VMEbus IACK space 166 as part of the memory map. This IACK space is not a defined memory space within the VMEbus standards. This memory space 166 is defined by the invention to permit initiation of an IACK cycle using a technique similar to the technique used to generate interrupts through access of memory space 148. More specifically, individual addresses within IACK space 166 are defined as individual VMEbus interrupt levels, i.e., levels 1-7. When microprocessor 66 is in the protected mode, the act of reading a selected memory location within IACK space 166 by a VMEbus device is interpreted as a VMEbus interrupt at the level corresponding to the level assigned to the address read.

The final memory space in the memory maps of FIGS. 5 and 6 is mapped as onboard EPROM space 168. The actual AT EPROM, containing system BIOS, resides at space 156 (it will be recalled that the real mode window space 154 occupies part of the 128K space allocated by the AT system for BIOS). Intel microprocessors such as the 80286 microprocessor 66 begin the power-on cycle by reading the uppermost byte of high memory (FFFFFF). When the IBM XT standard was defined, the uppermost byte resided at 0FFFFF, on the 1 megabyte boundary 146. Accordingly, system BIOS was placed at that location with the instruction at 0FFFFF being a jump to the beginning of the BIOS boot up sequence. When the AT computer was developed it was desired to remain compatible with the prior XT standards. To do this, the uppermost portion of memory, containing address FFFFFF, was mapped onto the EPROM space residing immediately below the 1 megabyte boundary 146. In this fashion, the initial jump instruction was made accessible to the more powerful 80286 microprocessor which powered up by accessing the uppermost byte in the 16 megabyte boundary instead of the uppermost byte at the 1 megabyte boundary. In practice, only the jump instruction at address FFFFFF is needed in order to power up the system. Thus the additional memory space within onboard EPROM space 168 may be allocated for other purposes, if desired.

The system software allows any memory reference by microprocessor 66 in the range 16000-FBFFFF to map into the VMEbus standard address space. The microprocessor's 24 bit address bus is mapped directly onto the 24 bit VMEbus address bus. The microprocessor 66 must be in protected mode to access this memory space. The address range from FC0000-FCFFFF is used to perform VMEbus Interrupt acknowledge cycles. A byte read from this address space will cause the invention to perform a VMEbus interrupt cycle (interrupt handler). The interrupt level acknowledged depends on the address of the byte read in accordance with the following Table II. Microprocessor 66 must be in protected mode in order to perform VMEbus IACK cycles through this address space.

TABLE II

| 80286 Address | VMEbus Interrupt Level |
|---|---|
| FC0003 | 1 |
| FC0005 | 2 |
| FC0007 | 3 |
| FC0009 | 4 |
| FC000B | 5 |
| FC000D | 6 |
| FC000F | 7 |

Any reference by microprocessor 66 to bytes in address space FD0000-FDFFFF will reference the VMEbus Short I/O address space. The lower 16 bits of the microprocessor 66 address bus is used to select a byte in the 64K Short I/O space. Microprocessor 66 must be in protected mode to access the Short I/O in this fashion.

The system software defines an I/O map which contains all the I/O ports of the IBM AT architecture and some additional ports. Six extra I/O ports are defined at I/O address space 30-35H. These 8 bit I/O ports are mapped as follows.

TABLE III

| I/O Port Address | I/O Port Name | Access |
|---|---|---|
| 30H | CONREG | IN/OUT |
| 31H | AUX_INT | IN ONLY |
| 32H | STATUS_1 | IN ONLY |
| 33H | STATUS_2 | IN ONLY |
| 34H | VME_HI_ADD | OUT ONLY |
| 35H | TRIG_WDT | IN/OUT |

The I/O port designated CONREG is the control register used to control many module functions. All bits of this port are set to zero when the module is reset. The bits are defined as set forth in Table IV below. Referring to Table IV it will be seen, for example, that the real mode window, by which microprocessor 66 communicates with the VMEbus in real mode, is controlled by bits 5 and 6 (D5, D6) of the CONREG port. A more complete discussion of this mode of control is set forth below.

TABLE IV

| | |
|---|---|
| D0 = 0 | The watchdog timer is disabled. |
| D0 = 1 | The watchdog timer is enabled. |
| D1 = 0 | The FAIL LED is on and the 682 is asserting SYSFAIL. |
| D1 = 1 | The FAIL LED is off and the 682 is not asserting SYSFAIL. |
| D2 = 0 | The PASS LED is off. |
| D2 = 1 | The PASS LED is on. |
| D3 = 0 | The VMEbus requester is to release the VMEbus. |
| D3 = 1 | The VMEbus requester is to acquire the VMEbus. |
| D4 = 0 | Auxiliary NMI sources are disabled. |
| D4 = 1 | Auxiliary NMI sources are enabled. |
| D6 = 0, D5 = 0 | Real mode window set to EPROM access. |
| D6 = 0, D5 = 1 | Real mode window set to VMEbus Short I/O access. |
| D6 = 1, D5 = 0 | Real mode window set to VMEbus Standard access. |
| D6 = 1, D5 = 1 | Real mode window set to VMEbus IACK cycle. |
| D7 = 0 | Auxiliary maskable interrupt disabled. |
| D7 = 1 | Auxiliary maskable interrupt enabled. |

With continued reference to Table III, the I/O port entitled AUX_INT is read to determine which auxiliary inputs (VMEbus interrupt 1-7 and the dual port interrupt) are pending. The port entitled STATUS_1 is used to indicate whether certain nonmaskable interrupt (NMI) latches are set, and whether an I/O channel error latch is set. Port STATUS_2 is a status port which determines certain operating conditions such as where dual access RAM 72 is mapped on the VMEbus, whether the VMEbus requester has ownership of the VMEbus, whether the VMEbus signals SYSFAIL and ACFAIL have been asserted and whether the watchdog timer has timed out. Port VME_HI_ADD is an output port used to provide the upper 8 address bits when the VMEbus Standard address space is accessed through the real mode window. This port identifies which of the available 256 64K blocks is being addressed in the VMEbus. Port TRIG_WDT is used to trigger the watchdog timer. Inputs or outputs to this port will trigger the watchdog timer. No data is exchanged during these accesses.

In use, the real mode window is 64K bytes long and resides at addresses 0E0000-0EFFFF. The window provides a mechanism for addressing the entire VMEbus memory space without the need to enter the microprocessor 66 protected mode. The window can be configured, via software, to address one of four entities: VMEbus Short I/O, VMEbus Standard address space, VMEbus IACK space, and EPROM.

The window is controlled by bits 5 and 6 of I/O port CONREG, as noted above. By appropriately setting bits 5 and 6 of the CONREG port one of the four above-named entities is selected. When the window is configured for EPROM the lowest 64K bytes of EPROM will appear in the window. This is the mode selected after reset. This mode is compatible with the IBM AT architecture. When the window is configured for the VMEbus IACK space, a byte read from the window will cause the invention to perform a VMEbus IACK cycle. The data returned from the byte read will be the status ID vector returned from the responding interrupter. In the presently preferred embodiment the VMEbus interrupt level acknowledged depends on the window address read. For example, window address 0E0003 corresponds to VMEbus interrupt level 1. Window address 0E0005 corresponds to VMEbus interrupt level 7, and so forth.

When the window is configured for VMEbus Short I/O, the 64K Short I/O address space may be accessed through the 64K window. Any references to the window will map into the VMEbus Short I/O space with the lower 16 address bits of microprocessor 66 being used as the VMEbus 16 bit address. For example, to read byte 1234H in the Short I/O address space, the window is configured for Short I/O and a byte is read at address 0E1234H.

When the window is configured for VMEbus Standard address space, the 64K window may be used to access any 64K block of the Standard VMEbus address space. In this mode, the 16 megabyte Standard address space is logically divided into 256 64K blocks. During these VMEbus accesses, the lower 16 address bits of microprocessor 66 are used as the lower 16 VMEbus address bits. The upper 8 VMEbus address bits used for the cycle are obtained from the 8 bit register VME_HI_ADD. Register VME_HI_ADD is an output port to microprocessor 66 residing at I/O address 34H.

Before accessing the window in this mode the upper 8 VMEbus address bits must be sent to register VME—HI—ADD. This defines which 64K byte block of the Standard VMEbus address space will be accessed. Subsequent accesses to the window will use the 8 bits in VME—HI—ADD and the lower 16 bits of the microprocessor's address form the 24 bit VMEbus address. For example, to read word 123456H in the VMEbus Standard address space, the window is configured for VMEbus Standard address space and the value 12H is output to port VME—HI—ADD (address 34H). A word is read at address 0E3456H. The word returned will be from VMEbus address 123456H.

In order to effect a VMEbus master cycle bit 3 of port CONREG is set to 1 and bit 4 of port STATUS—2 is polled, waiting until its value becomes 0. A VMEbus master/interrupt handler cycle may then be executed as required followed by the resetting of bit 3 of CONREG to 0. The invention retains control of the VMEbus for duration of the master/interrupt handler cycle. It may be necessary to minimize the time taken for this cycle in systems which require fast access by other VMEbus masters.

VMEbus cycles may be terminated with BERR or DTACK. The invention detects BERR, the assertion of which has the same effect as a parity error on the I/O channel. The BERR signal is linked into the IBM AT architecture in the same manner as described in connection with other signals. Bit 3 of I/O port B (I/O address 16H) enables the BERR* signal. When enabled, the assertions of BERR during a master cycle by the invention will cause a latch to set. The status of this latch can be detected by bit 0 of input port STATUS—1. When the bit is set, the BERR latch is set, generating an I/O channel error nonmaskable interrupt (NMI). This will also set bit 6 of I/O port B, indicating an I/O channel error. The latch is reset by sending the value 1 to bit 3 of the AT port B. If desired, a jumper may be used to disable the BERR signal. When disabled, the BERR signal will not cause I/O channel errors.

VMEbus interrupts are handled by the system software as follows. Each VMEbus interrupt line has a bit position in the AUX—INT input port. VMEbus interrupt level 7 corresponds to AUX—INT bit position 7, and so on through the VMEbus interrupt level 1, which corresponds to AUX—INT bit position 1. When a particular bit in AUX—INT is set, the corresponding VMEbus interrupt is pending.

When the microprocessor 66 receives an interrupt on IRQ10-IRQ12 or IRQ15, the user program must read the AUX—INT port to determine the VMEbus interrupt level. The user program must perform a read in the VMEbus IACK space to obtain the vector and complete the VMEbus IACK cycle. Software should check to ensure the VMEbus interrupter has negated its interrupt before leaving the interrupt service routine.

Another VMEbus master may interrupt the invention by reading any one of the lower 16 bytes of the dual access RAM 72. When this access occurs the dual port interrupt is latched and remains latched until bit 7 of CONREG is reset. The status of this interrupt is available in AUX—INT bit 0. When bit 0 is set, the interrupt is pending. The dual port interrupt must be cleared by resetting bit 7 of CONREG. If desired, a jumper may be provided to enable and disable this interrupt.

The invention implements auxiliary nonmaskable interrupts for the abort button, the watchdog timer and VMEbus signals SYSFAIL and ACFAIL. The IBM AT architecture provides a mechanism to disable and enable nonmaskable interrupts. An output to port 70H with D7=0 will enable nonmaskable interrupts. An output to port 70H with D7=1 disables nonmaskable interrupts. This same mechanism will enable and disable the additional nonmaskable interrupts provided by the invention. All four of these additional interrupts are implemented as latches. When the interrupt event occurs and is enabled, the latch will set. The latch remains set until the interrupt is disabled or a system reset occurs.

SYSFAIL, ACFAIL and the abort button are all enabled by bit 4 of CONREG. If bit 4 is on, the occurrence of the interrupt event will set a latch, which remains set until bit 4 is reset. When the latch is set a nonmaskable interrupt will occur if the module nonmaskable interrupt is enabled. The state of these latches can be determined by checking input port STATUS—1. SYSFAIL latch is bit 2, ACFAIL latch is bit 1 and the abort button latch is bit 3. When these bits are high, the corresponding latch is set.

A watchdog timer interrupt is enabled by bit 0 of CONREG. The watchdog timer has a timeout period approximately 150 milliseconds in the presently preferred embodiment. If bit 0 of CONREG is set and the watchdog timer expires, a latch will set and remain set until bit 0 of CONREG is reset. If the module nonmaskable interrupt is enabled, the setting of this latch will generate an auxiliary nonmaskable interrupt. The state of this latch is available in bit 7 as input port STATUS—2. When the latch is set, bit 7 will read 0. When the latch is reset, bit 7 will read 1.

The watchdog timer is triggered from outputs or inputs through input/output port TRIG—WDT. When the watchdog timer times out and causes an auxiliary nonmaskable interrupt, the watchdog timer cannot be retriggered until bit 0 of CONREG is reset. In the presently preferred embodiment all four auxiliary nonmaskable interrupts can be permanently disabled by changing a jumper.

In order to render the VMEbus and microprocessor 66 addressing conventions compatible, a byte-swapping technique is employed. The VMEbus and the 80286 microprocessor conventions differ in the manner in which each addresses data bus bits and the manner in which each handles numeric variables longer than 8 bits. Under the VMEbus convention data bus bits in the range D15-D08 are at the byte 0 position and data bits in the range D7-D0 are in the byte 1 position. Under the 80286 convention it is just the opposite. Accordingly, the invention implements a byte-swapping technique in which byte 0 of microprocessor 66 is connected to D15-D8 on the VMEbus and byte 1 of microprocessor 66 is connected to D7-D0 of the VMEbus. With respect to the treatment of numeric variables longer than 8 bits, the 80286 stores the least significant byte (LSB) at the lower address while the VMEbus requires the most significant byte (MSB) to be stored at the lowest address. This difference is handled in software. The user program must take care when exchanging numeric variables longer than 8 bits between microprocessor 66 and the VMEbus, to ensure that the proper swapping is implemented.

From the foregoing it will be understood that the present invention provides an interface apparatus which is well suited for interconnecting the AT bus of an AT computer with a VMEbus, to allow the AT computer to respond to the VMEbus as a slave device and also to allow the AT computer to respond as a VMEbus master. While the invention has been described in its presently preferred embodiment, it will be understood that certain modifications to the circuit may be made without departing from the spirit of the invention as set forth in the appended claims.

What is claimed is:

1. An interface apparatus for interconnecting an AT computer having an AT bus with a VMEbus having a VMEbus backplane to allow the AT computer to respond to VMEbus slave requests as a VMEbus slave, comprising:

a circuit card having an AT bus disposed thereon for plugging directly into said VMEbus backplane and for receiving operating power from said VMEbus backplane;

a central processing unit (CPU) disposed on said circuit card and connected to said AT bus and forming a portion of said AT computer;

a direct memory access (DMA) means connected to said AT bus and forming a portion of said AT computer;

interconnection means coupled to said AT bus and to said VMEbus, said interconnection means including bus arbiter means coupled to said DMA means and to said CPU for responding to slave requests from said VMEbus and for receiving and responding to DMA requests from said AT bus;

dual access random access memory (RAM) means coupled to said AT bus and to said VMEbus having means whereby both said AT bus and said VMEbus can access said RAM;

controller means coupled to said bus arbiter means, to said CPU and to said AT and VMEbuses and being responsive to said bus arbiter and to said CPU for controlling the communication between said RAM means and said AT and VMEbuses;

said bus arbiter, upon receipt of a slave request, causing said CPU to be placed in a hold state and inhibiting access to said AT bus by said DMA means and further issusing a slave grant signal to said controller means;

said controller means, upon receipt of said slave grant signal and in response to a request by said CPU to access said RAM, causing said RAM to place data on said VMEbus and thereafter causing a data transfer acknowledge (DTACK) signal to be issued to said VMEbus thereby indicating that said AT computer has responded to said slave request.

2. The interface apparatus of claim 1 wherein said VMEbus provides a backplane and wherein said interface apparatus is adapted to plug directly into said backplane.

3. The interface apparatus of claim 1 wherein said VMEbus provides a backplane and wherein said interface apparatus further comprises a circuit card adapted to plug directly into said backplane;

said circuit card supporting said central processing unit and said dual access random access memory.

4. The interface apparatus of claim 11 further comprising an input/output circuit disposed on a circuit board adapted to plug directly into said circuit card.

5. The interface apparatus of claim 4 wherein said input/output circuit comprises disk drive supporting circuitry.

6. The interface apparatus of claim 4 wherein said input/output circuit comprises monitor supporting circuitry.

7. The interface apparatus of claim 4 wherein said circuit board and circuit card are provided with plug and jack means for connecting said board and card together in a spatially parallel configuration.

8. An interface apparatus for interconnecting an AT computer having an AT bus with a VMEbus having a VMEbus backplane to allow the AT computer to respond as a VMEbus master, comprising:

a circuit card having an AT bus disposed thereon for plugging directly into said VMEbus backplane and for receiving operating power from said VMEbus backplane;

a central processing unit (CPU) connected to said AT bus and forming a portion of said AT computer;

interconnection means coupled to said AT bus and to said VMEbus, said interconnection means including master address decoder means coupled to said CPU for decoding predefined addresses;

said interconnection means further including requester and controller means coupled to said master address decoder means, to said CPU and to said VMEbus for asserting a VMEbus request to said VMEbus in response to the addressing of said predefined addresses by said CPU and for monitoring said VMEbus and issuing bus ready signals to said CPU following said VMEbus request;

said CPU having at least two modes of operation, a real mode and a protected mode, and wherein said interface apparatus further comprising dual access random access memory (RAM) means coupled to said AT bus and to said VMEbus and has means whereby both said AT bus and said VMEbus can access said RAM means and wherein said RAM means is divided into two portions by a real mode/protected mode boundary;

wherein said RAM means defines a window between predetermined address limits below the real mode/protected mode boundary and wherein said interconnection means maps addresses between said address limits onto said VMEbus when said CPU is in said real mode; and wherein said RAM means defines predetermined addresses above the real mode/protected mode boundary accessible in said protected mode and wherein said interconnection means maps said predetermined addresses onto said VMEbus when said CPU is in said protected mode.

9. The interface apparatus of claim 2 wherein said circuit card supporting said dual access random access memory.

10. The interface apparatus of claim 9 further comprising an input/output circuit disposed on a circuit board adapted to plug directly into said circuit card.

11. The interface apparatus of claim 10 wherein said input/output circuit comprises disk drive supporting circuitry.

12. The interface apparatus of claim 10 wherein said input/output circuit comprises monitor supporting circuitry.

13. The interface apparatus of claim 10 wherein said circuit board and circuit card are provided with plug and jack means for connecting said board and card together in a spatially parallel configuration.

* * * * *